US011369986B2

United States Patent
Yoder et al.

(10) Patent No.: US 11,369,986 B2
(45) Date of Patent: Jun. 28, 2022

(54) RETRACTABLE NOZZLE FOR REFRACTORY-LINED EQUIPMENT

(71) Applicant: ExxonMobil Technology and Engineering Company, Annandale, NJ (US)

(72) Inventors: Patrick L. Yoder, Montgomery, TX (US); Christopher J. Fowler, Houston, TX (US); Aaron M. Schlett, Conroe, TX (US); Laura E. Johnsen, Spring, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 141 days.

(21) Appl. No.: 16/709,976

(22) Filed: Dec. 11, 2019

(65) Prior Publication Data

US 2020/0206769 A1 Jul. 2, 2020

Related U.S. Application Data

(60) Provisional application No. 62/784,892, filed on Dec. 26, 2018.

(51) Int. Cl.
*B01J 19/02* (2006.01)
*B01J 19/26* (2006.01)
(Continued)

(52) U.S. Cl.
CPC ............... *B05B 15/14* (2018.02); *B01J 4/002* (2013.01); *B01J 19/02* (2013.01); *B01J 19/26* (2013.01);
(Continued)

(58) Field of Classification Search
CPC .......... B05B 15/14; B05B 15/62; B01J 4/002; B01J 19/02; B01J 19/26;
(Continued)

(56) References Cited

U.S. PATENT DOCUMENTS 4,268,017 A * 5/1981 Cole .......................... C21B 7/16
266/265
7,829,010 B2 11/2010 Schwadron et al.
(Continued)

OTHER PUBLICATIONS

The International Search Report and Written Opinion of PCT/US2019/065577 dated Mar. 19, 2020.

*Primary Examiner* — Huy Tram Nguyen
(74) *Attorney, Agent, or Firm* — Vorys, Sater, Seymour and Pease LLP (57) ABSTRACT

A refractory-lined equipment includes a vessel defining an interior at least partially lined with a refractory material, and a nozzle assembly coupled to the vessel and extending into the interior. The nozzle assembly includes an outer sleeve fixed to the sidewall and extending through an aperture defined in the sidewall, the outer sleeve defining a central passageway, and a nozzle cartridge assembly positionable within the central passageway and including an inner sleeve, a refractory lining disposed about the inner sleeve, and a nozzle positioned within the inner sleeve. The nozzle cartridge assembly is removably coupled to the outer sleeve external to the vessel.

19 Claims, 4 Drawing Sheets (51) Int. Cl.
*B01J 4/00* (2006.01)
*B05B 15/14* (2018.01)
*B05B 15/62* (2018.01)
*C10G 75/00* (2006.01)

(52) U.S. Cl.
CPC .............. *B05B 15/62* (2018.02); *C10G 75/00* (2013.01); *B01J 2219/00024* (2013.01); *B01J 2219/0218* (2013.01); *C10G 2300/4075* (2013.01)

(58) Field of Classification Search
CPC ...... B01J 2219/00024; B01J 2219/0218; B01J 2208/00902; C10G 75/00; C10G 2300/4075; Y02P 10/20; C21C 5/462; C21C 5/5217; C21C 5/4606; C21B 7/163
USPC ........................................................ 239/600
See application file for complete search history.

(56) References Cited

U.S. PATENT DOCUMENTS

2008/0245189 A1    10/2008   Williams et al.
2008/0308979 A1*   12/2008   Fraser ..................... F27D 3/16
                                                                        266/270

* cited by examiner

RETRACTABLE NOZZLE FOR REFRACTORY-LINED EQUIPMENT

CROSS REFERENCE TO RELATED APPLICATION

This application relates and claims priority to U.S. Provisional Application No. 62/784,892 filed on Dec. 26, 2018, the disclosure of which is specifically incorporated herein by reference in its entirety.

BACKGROUND

In the oil and gas industry, numerous pieces of equipment, vessels, and transfer lines used in hydrocarbon refining are lined with erosion and heat resistant refractory materials. One or more nozzles commonly penetrate the walls of such equipment for a variety of purposes. Some nozzles, for example, are used for injecting liquids, chemicals, gases, or other substances into such equipment, or may alternatively be used for removing substances from the equipment. Other nozzles are closed-ended and incorporate various types of gauges or sensors that monitor operational parameters (e.g., temperature, pressure, etc.) within the equipment.

Nozzles installed in refractory-lined equipment are also typically lined with refractory materials. Over time, however, the refractory lining of the nozzles and/or the metal portion of the nozzle extending into the equipment may become damaged due to corrosion, erosion, high temperature exposure, or other degradation mechanisms. Since such damage can render the nozzles unreliable/nonfunctional, the nozzles are periodically inspected. Nozzle inspection, however, currently requires a worker to physically enter the interior of the refractory-lined equipment to locate and visually examine the nozzles. In large equipment, such as reactors or pressure vessels, complex scaffolding must be erected within the equipment to support the worker at the proper elevation.

If a given nozzle requires repair, the worker must physically remove the surrounding refractory from the inner wall of the equipment and about the nozzle by mechanical means (e.g., a jackhammer). If the nozzle body is damaged and requires replacement, the worker must break the welds that fix the nozzle to the equipment, extract the nozzle, and clean the underlying substrate. A new nozzle may then be welded to the substrate and replacement refractory materials may subsequently be reinstalled about the exterior of the nozzle and on the surrounding wall. In smaller equipment, such as 18-inch transfer lines (pipes), nozzles are inspected remotely with a camera, and if there is damage, whole sections of the pipe must be removed and replaced.

Physical entry into the refractory-lined equipment can be time consuming and exposes workers to several safety risks, including confined space entry. There can also be significant collateral damage associated with removal of refractory and mechanical work associated with rehabilitating or replacing the nozzle. For instance, repair work done in the field under less-than-ideal conditions can lead to quality issues, which may require rework or acceptance of lower quality work.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DESCRIPTION

The present disclosure is related to refractory-lined equipment and, mort particularly, to externally retractable nozzle assemblies coupled to the refractory-lined equipment.

The embodiments discussed herein describe nozzle assemblies that allow for faster nozzle repair and replacement, reduced exposure of personnel to safety risks, such as equipment entry and working in confined spaces, and higher quality repairs. As described herein, inspection and repairs to the presently disclosed nozzle assemblies can be done external to refractory-lined equipment, thus eliminating the need for workers to physically enter the refractory-lined equipment.

Example refractory-lined equipment described herein may include a vessel defining an interior at least partially lined with a refractory material, and a nozzle assembly coupled to the vessel and extending into the interior. The nozzle assembly may include an outer sleeve fixed to the sidewall and extending through an aperture defined in the sidewall. The outer sleeve may define a central passageway, and a nozzle cartridge assembly may be positionable within the central passageway. In some embodiments, the nozzle cartridge assembly may include an inner sleeve, a refractory lining disposed about the inner sleeve, and a nozzle positioned within the inner sleeve. In other embodiments, however, the nozzle cartridge assembly may include a nozzle and a refractory lining interposing the nozzle and an inner wall of the outer sleeve. In either embodiment, the nozzle cartridge assembly may be removably coupled to the outer sleeve external to the vessel.

Figure 1:
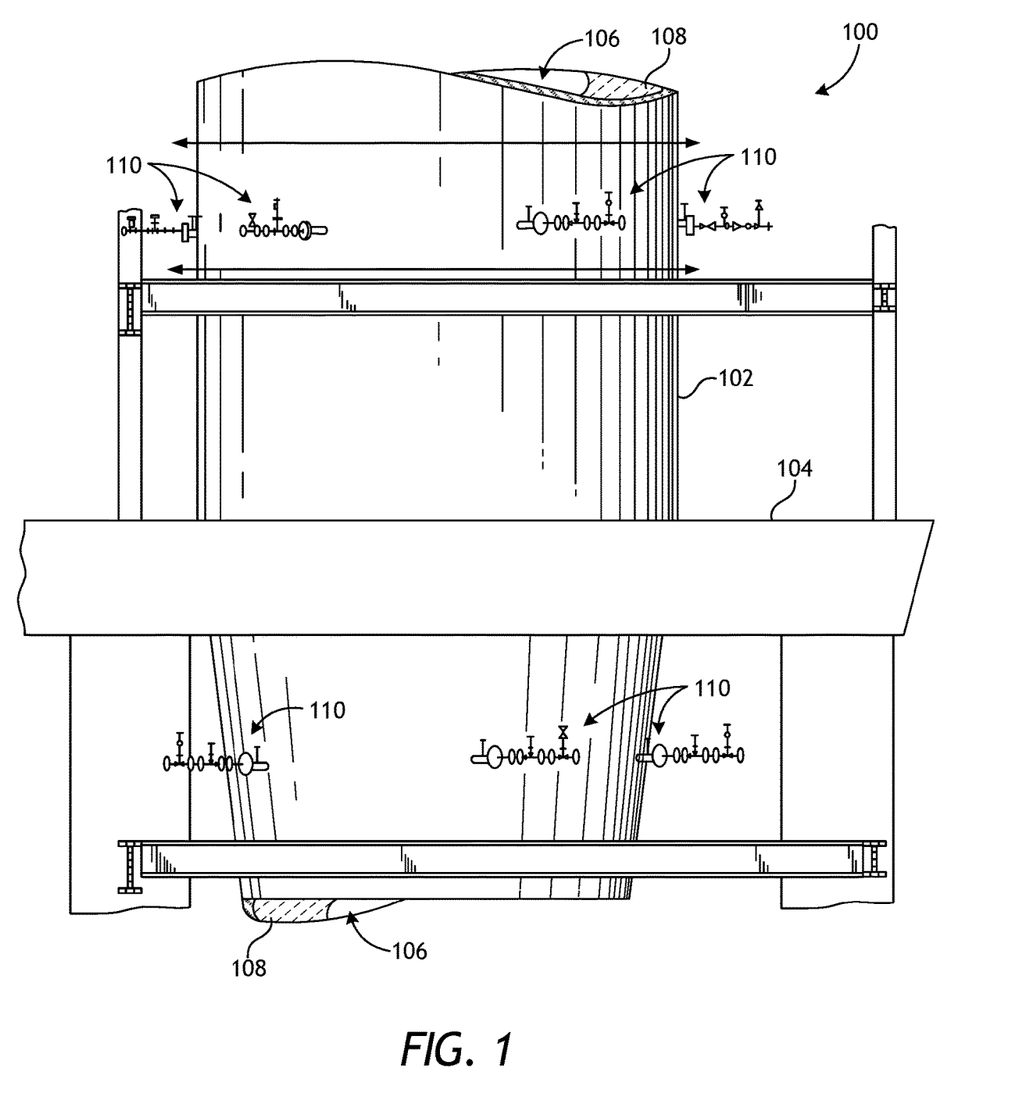
FIG. 1 is a partial schematic side view of example refractory-lined equipment that may incorporate the principles of the present disclosure.

FIG. 1 is a schematic partial side view of example refractory-lined equipment 100 that may incorporate the principles of the present disclosure. In the illustrated embodiment, the refractory-lined equipment 100 comprises a reactor vessel used for chemical or catalytic conversion of hydrocarbons. The principles described herein, however, may alternatively be used with other types of equipment lined with refractory including, but not limited to, a thermal processing unit (e.g., fluid catalytic cracking unit or "FCCU"), a pressure vessel, a fired heater, a furnace, a conveyance pipe or line (e.g., catalyst transfer line), a fixed bed reactor, a gasifier, an incinerator, a drum, a stack, a coker unit (e.g., a FLEXICOKER™ unit, or any combination thereof.

As illustrated, the refractory-lined equipment 100 may include a vessel 102, and a framework 104 or other type of support structure may optionally support the vessel 102. The top and bottom portions of the vessel 102 are removed (exposed) for purposes of the present description, but would otherwise be intact. As illustrated, the vessel 102 defines an interior 106, and all or a portion of the inner wall of the interior 106 may be lined or otherwise covered with a refractory material 108. The refractory material 108 may be anchored or otherwise secured to the inner wall via any known anchoring or attachment method. Suitable materials for the refractory material 108 include, but are not limited to, silicon carbide, magnesia, alumina, alumina graphite, magnesia graphite, high temperature porcelain, zirconia, zirconia ceramic, alumino-silicate, silica, carbon/graphite, silicon nitride, spinel, or any combination thereof.

The refractory-lined equipment 100 may include or otherwise incorporate one or more nozzle assemblies 110 (seven shown) coupled to the outer wall of the refractory-lined equipment 100 at different points as well as at varying elevations (or distances) along an axis of the equipment 100. At least a portion of each nozzle assembly 110 may penetrate the vessel 102 and extend a short distance into the interior 106 to facilitate a variety of operations. One or more of the nozzles 110, for example, may comprise a feed nozzle that includes an open-ended nozzle structure configured to supply a gas (e.g., air, nitrogen, steam, etc.), a liquid (e.g., crude oil, water, etc.), a chemical, or another substance into the interior 106. Other nozzles 110, however, may comprise an instrumentation nozzle that includes a close-ended nozzle structure that houses instrumentation sensors or gauges designed to measure various operational parameters (e.g., temperature, pressure, etc.) within the interior 106. Yet other types of nozzles 110 may include nozzles suitable for gas detection (e.g., NO, NOx, etc.), particulates (e.g., for opacity, etc.).

Figure 2:
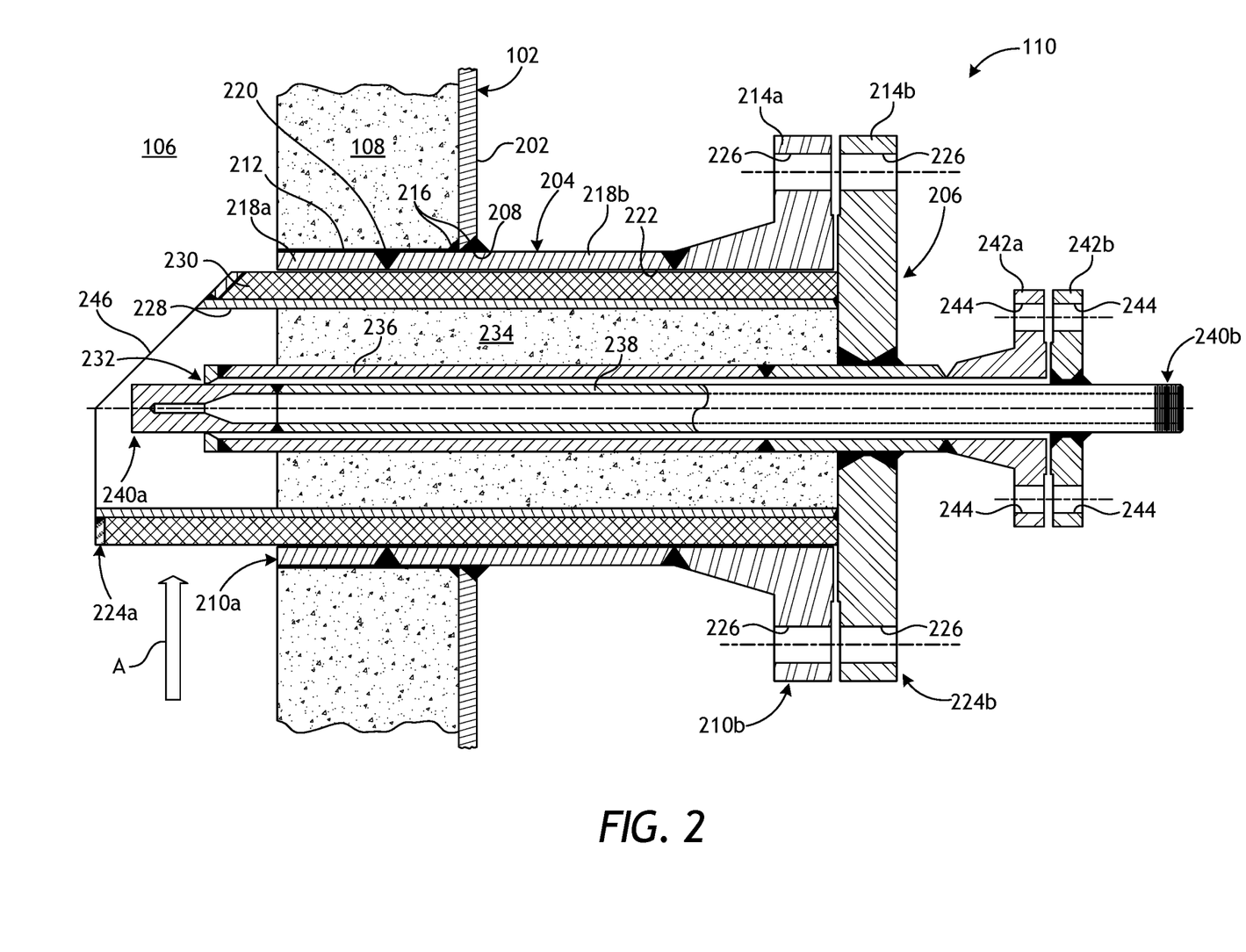
FIG. 2 is an enlarged cross-sectional side view of an example nozzle assembly, according to one or more embodiments of the present disclosure

FIG. 2 is an enlarged cross-sectional side view of one of the nozzle assemblies 110 of FIG. 1, according to one or more embodiments of the present disclosure. The nozzle assembly 110 may represent any of the nozzle assemblies 110 of FIG. 1, or alternatively any nozzle assembly that may be used in conjunction with any refractory-lined equipment mentioned herein. As illustrated, the nozzle assembly 110 may be coupled to a sidewall 202 of the vessel 102 and extend a short distance into the interior 106.

The nozzle assembly 110 may include an outer sleeve 204 and a nozzle cartridge assembly 206 positioned within the outer sleeve 204. The outer sleeve 204 may be received within an aperture 208 defined in the sidewall 202 of the vessel 102. In some embodiments, the outer sleeve 204 and the aperture 208 may each exhibit a generally circular cross-section, but may alternatively exhibit other cross-sectional shapes including, but not limited to, polygonal (e.g., triangular, rectangular, pentagonal, etc.), oval, ovoid, or any combination thereof.

The outer sleeve 204 may provide a first end 210a and a second end 210b opposite the first end 210a. The first end 210a may extend into the interior 106 of the vessel 102 penetrate the refractory material 108 arranged on the inner wall of the sidewall 202. In some embodiments, as illustrated, the first end 210a may terminate substantially flush with the refractory material 108. In other embodiments, however, the first end 210a may terminate past or within the depth of the refractory material 108, without departing from the scope of the disclosure. In at least one embodiment, a layer of ceramic paper 212 or the like may interpose the refractory material 108 and the outer surface of the outer sleeve 204.

The second end 210b of the outer sleeve 204 may provide or otherwise define a first flange 214a. In at least one embodiment, as discussed below, the nozzle cartridge assembly 206 may be removably coupled to the outer sleeve 204 at the first flange 214a via a bolted flange connection.

The outer sleeve 204 may be fixed to the sidewall 202 using one or more welds 216. In some embodiments, the welds 216 may be applied on both the inner and outer surfaces of the sidewall 202, but may alternatively be applied on only one of the inner or outer surfaces, without departing from the scope of the disclosure.

In some embodiments, the outer sleeve 204 may be made of a single material (i.e., "single metallurgy") along its axial length between the first and second ends 210a,b. In such embodiments, the outer sleeve 204 may be made of, for example, a variety of carbon steel materials and carbon steel alloys such as, but not limited to, C 0.5% Mo and C 0.25% Cr. In addition to carbon steels containing a ferritic phase, those containing austenite and/or martensite may be used as well such as, but not limited to austenitic types 304 and 310 and martensitic type 410. In other embodiments, however, the outer sleeve 204 may be made of at least two materials (i.e., "dual metallurgy") along its axial length. In such embodiments, the outer sleeve 204 may include a first portion 218a and a second portion 218b joined at a weld seam 220. Since the first portion 218a will be exposed to the environment within the interior 106 of the vessel 102, the first portion 218a may be made of materials exhibiting elevated resistance to corrosion, erosion, abrasion, etc. Suitable materials for the first portion 218a include, but are not limited to, any of the carbon steel alloys mentioned herein. The second portion 218b, however, may extend outside of the vessel 102 and may thus be made of less robust materials such as carbon steel. In at least one embodiment, the second portion 218b may be made of the same as the sidewall 202, thus eliminating the need to make a bi-metallic weld at the welds 216.

The outer sleeve 204 defines an opening or central passageway 222 sized to receive the nozzle cartridge assembly 206. The nozzle cartridge assembly 206 may include a first end 224a and a second end 224b opposite the first end 224a. The first end 224a may be designed to extend into the interior 106 of the vessel 102 via the central passageway 222. In some embodiments, as illustrated, the first end 224a may protrude or otherwise extend past the first end 210a of the outer sleeve 204. In other embodiments, however, the first end 224a may terminate substantially flush with the end 210a of the outer sleeve 204, without departing from the scope of the disclosure.

The nozzle cartridge assembly 206 may be removably coupled to the outer sleeve 204 to enable a worker to disengage and retract the nozzle cartridge assembly 206 from the outer sleeve 204 external to the vessel 102. In some embodiments, for example, the second end 224b of the nozzle cartridge assembly 206 may provide or otherwise define a second flange 214b, and the nozzle cartridge assembly 206 may be removably coupled to the outer sleeve 204 at the first and second flanges 214a,b via a bolted flange connection. In such embodiments, the first and second flanges 214a,b may define coaxially aligned apertures 226 sized to receive corresponding mechanical fasteners (e.g., nut and bolt assemblies) that removably attach the nozzle cartridge assembly 206 to the outer sleeve 204. In other embodiments, however, the nozzle cartridge assembly 206 may be removably coupled to the outer sleeve 204 via other removable attachment means such as, but not limited to, a snap-fit or collet engagement, an interference fit, welded flanges 214a,b, or any combination thereof.

Enabling the nozzle cartridge assembly 206 to be disengaged or separated from the outer sleeve 204 and retracted external to the vessel 102 eliminates the need for a worker to physically enter the interior 106 of the vessel 102. Instead, the nozzle cartridge assembly 206 may be removed and inspected outside of the vessel 102. If the nozzle cartridge assembly 206 requires replacement, a prefabricated replacement nozzle cartridge assembly may be quickly installed into the outer sleeve 204 via the central passageway 222.

As illustrated, the nozzle cartridge assembly 206 may include an inner sleeve 228, a refractory lining 230 disposed about the inner sleeve 228, and a nozzle 232 positioned within the inner sleeve 228. In some embodiments, the second flange 214b may be coupled to or otherwise form part of the inner sleeve 228. In other embodiments, the second flange 214b may be coupled to or form part of the nozzle 232. In yet other embodiments, the second flange 214b may be coupled to each of the inner sleeve 228 and the nozzle 232.

The refractory lining 230 may be anchored to the outer surface of the inner sleeve 228 and, when the nozzle cartridge assembly 206 is positioned within the central passageway 222, the refractory lining 230 may interpose the inner sleeve 228 and the inner wall of the outer sleeve 204. The refractory lining 230 may be composed of any of the refractory materials mentioned herein with reference to the refractory material 108. In some embodiments, the refractory lining 230 may include a hexagonal mesh (alternately referred to as "hexmesh") anchored to the inner sleeve 228. The hexagonal mesh may be composed of long metal ribbons interconnected to form a plurality of discrete refractory cells, and a refractory or refractory material may be received within each refractory cell. In other embodiments, the refractory lining 230 may comprise a plurality of high-temperature refractory castables or shaped refractories secured to the outer surface of the inner sleeve 228. In yet other embodiments, the refractory lining may comprise a ceramic fiber product, a refractory plastic, an engineered ceramic, or any combination thereof.

The refractory lining 230 may be prefabricated, cured, and fired prior to installation (attachment) on the inner sleeve 228, thus eliminating the need to cure and fire the refractory material in situ during startup of the equipment (e.g., the refractory-lined equipment 100 of FIG. 1). As will be appreciated, this may save time and improve reliability since drying refractory materials, such as castable refractory materials, requires a controlled dry out process to prevent damage (e.g., cracking). Such dry out processes can be time consuming and difficult to execute in situ within refractory-lined equipment (e.g., the equipment 100 of FIG. 1). In contrast, the refractory lining 230 of the present disclosure may be dried and cured in a controlled manner prior to installation on the inner sleeve 228.

In some embodiments, the nozzle cartridge assembly 206 may optionally include a refractory layer 234 interposing the inner sleeve 228 and the nozzle 232. The refractory layer 234 may be made of any of the refractory materials mentioned herein with reference to the refractory material 108. In some embodiments, the refractory layer 234 may be anchored to the inner surface of the inner sleeve 228, but may alternatively be anchored to the outer surface of the nozzle 232, or both, without departing from the scope of the disclosure. The composition of the refractory layer 234 may be similar to the refractory lining 230, such as being formed of a hexagonal mesh, or otherwise comprising a plurality of high-temperature refractory castables or shaped refractories. Moreover, similar to the refractory lining 230, the refractory materials of the refractory layer 234 may advantageously be prefabricated, cured, and fired prior to installation, thus eliminating the need to cure and fire the refractory material in situ.

In the illustrated embodiment, the nozzle 232 comprises a two-piece assembly including a nozzle sleeve 236 and an instrumentation nozzle 238 arranged within the nozzle sleeve 236. The instrumentation nozzle 238 has a first end 240a and a second end 240b opposite the first end 240a. As illustrated, the first end 240a is closed, which allows one or more sensors or gauges to be positioned within the instrumentation nozzle 238 to measure internal operational parameters (e.g., temperature, pressure, etc.) within the interior 106. Example sensors and gauges that may be included in the instrumentation nozzle 238 include, but are not limited to, a temperature sensor (e.g., a thermocouple), a pressure sensor, a gas detection sensor, a particulate sensor, or any combination thereof. The second end 240b may be operatively coupled to other equipment to enable transfer of measured signals obtained via the sensors or gauges.

In some embodiments, the instrumentation nozzle 238 may be removably coupled to the nozzle sleeve 236 to enable a worker to disengage and externally retract the instrumentation nozzle 238 from the nozzle sleeve 236. In some embodiments, for example, the instrumentation nozzle 238 may be removably coupled to the nozzle sleeve 236 via a bolted flange connection. In such embodiments, as illustrated, the nozzle sleeve 236 and the instrumentation nozzle 238 may each provide or otherwise define a flange 242a and 242b, respectively, and each flange 242a,b may define coaxially-aligned apertures 244 sized to receive corresponding mechanical fasteners (e.g., nut and bolt assemblies) that removably attach the instrumentation nozzle 238 to the nozzle sleeve 236. In other embodiments, however, the instrumentation nozzle 238 may be removably coupled to the nozzle sleeve 236 via other removable attachment means such as, but not limited to, a snap-fit or collet engagement, an interference fit, or any combination thereof.

In other embodiments, the instrumentation nozzle 238 may be replaced with an open-ended a feed nozzle, alternately referred to as a "process stream nozzle." In such embodiments, the feed nozzle may be used to introduce a variety of substances into the interior 106 such as, but not limited to, a gas (e.g., air, nitrogen, steam, etc.), a liquid (e.g., crude oil, water, etc.), a chemical, a fluid solid (e.g., a catalyst, coke particles, additives, a sulfur or amine gas for incineration, etc.), a pollution control agent (e.g., SOx emission reduction, a pH additives, etc.), or any combination thereof. In other embodiments, however, the feed nozzle may be used to remove substances (e.g., gases, liquids, etc.) from the equipment. In yet other embodiments, the instrumentation nozzle 238 may be entirely omitted from the nozzle 232, and the nozzle sleeve 236 may generally operate as a feed nozzle.

In some embodiments, as illustrated, a portion 246 of the second end of the nozzle cartridge assembly 206 may be angled. The angled portion 246 may prove advantageous in applications where there is fluid flowing through the vessel 102, such as in applications where the vessel 102 is a conveyance pipe or line (e.g., catalyst transfer line). In such embodiments, a fluid, such as a catalyst or another erosive material, may flow upward in the direction indicated by the arrow A. The flow A directly impacts the refractory lining 230 on the bottom of the nozzle cartridge assembly 206, which shields the nozzle 232 from directly contacting the erosive flow A. The angled portion 246, however, may be defined on the upper portion of the nozzle cartridge assembly 206 and may allow the nozzle 232 to communicate directly with the interior 106.

Figure 3:
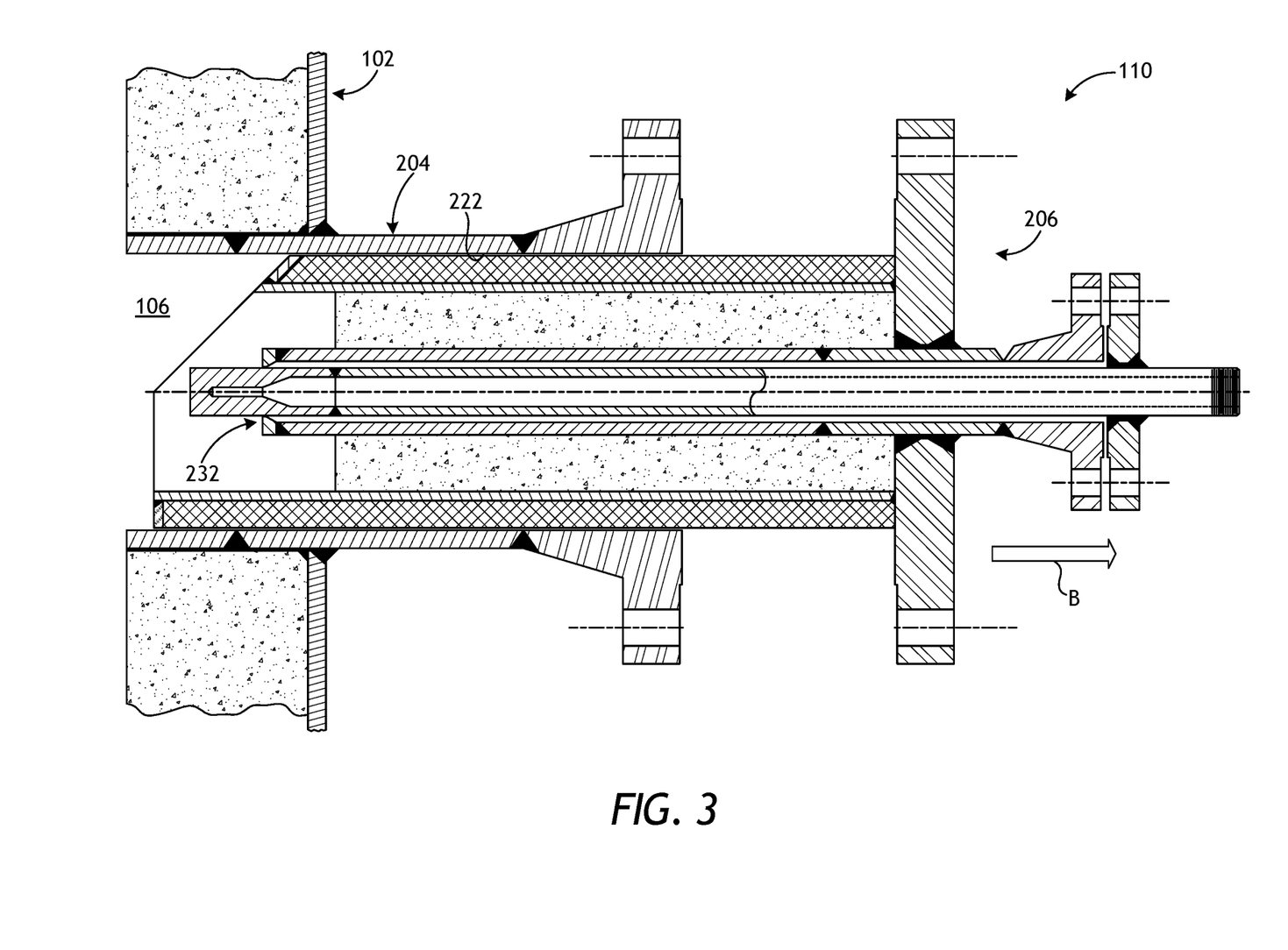
FIG. 3 is another enlarged cross-sectional side view of the nozzle assembly of FIG. 2.

FIG. 3 is another enlarged cross-sectional side view of the nozzle assembly of FIG. 2 with the nozzle cartridge assembly 206 partially retracted. As illustrated, the nozzle cartridge assembly 206 is disengaged (detached, uncoupled, etc.) from the outer sleeve 204 and moved a short distance within the central passageway 222 in the direction indicated by the arrow B. Moving the nozzle cartridge assembly 206 further in the direction B will fully disengage the nozzle cartridge assembly 206 from the outer sleeve 204 and fully expose the central passageway 222. A new, replacement nozzle cartridge assembly may then be installed in the outer sleeve 204 via the central passageway 222, which acts as a guide. The new nozzle cartridge assembly may then be removably attached to the outer sleeve 204 in any of the ways mentioned herein for removably attaching the nozzle cartridge assembly 206 to the outer sleeve 204.

Accordingly, the nozzle assembly 110 includes an externally retractable, refractory-lined nozzle cartridge assembly 206, which, as mentioned above, eliminates the need for a worker to physically enter the interior 106 of the vessel to inspect the nozzle assembly 110 or the nozzle 232. Instead, the process of removing, inspecting, and replacing (if needed) the nozzle cartridge assembly 206 may be all be accomplished outside of the vessel 102. Moreover, the damaged nozzle cartridge assembly 206 may be swapped out with a prefabricated replacement nozzle cartridge assembly, thus eliminating the onerous task of attaching a new nozzle, assembling the associated refractory, and curing the refractory for operational use.

Figure 4:
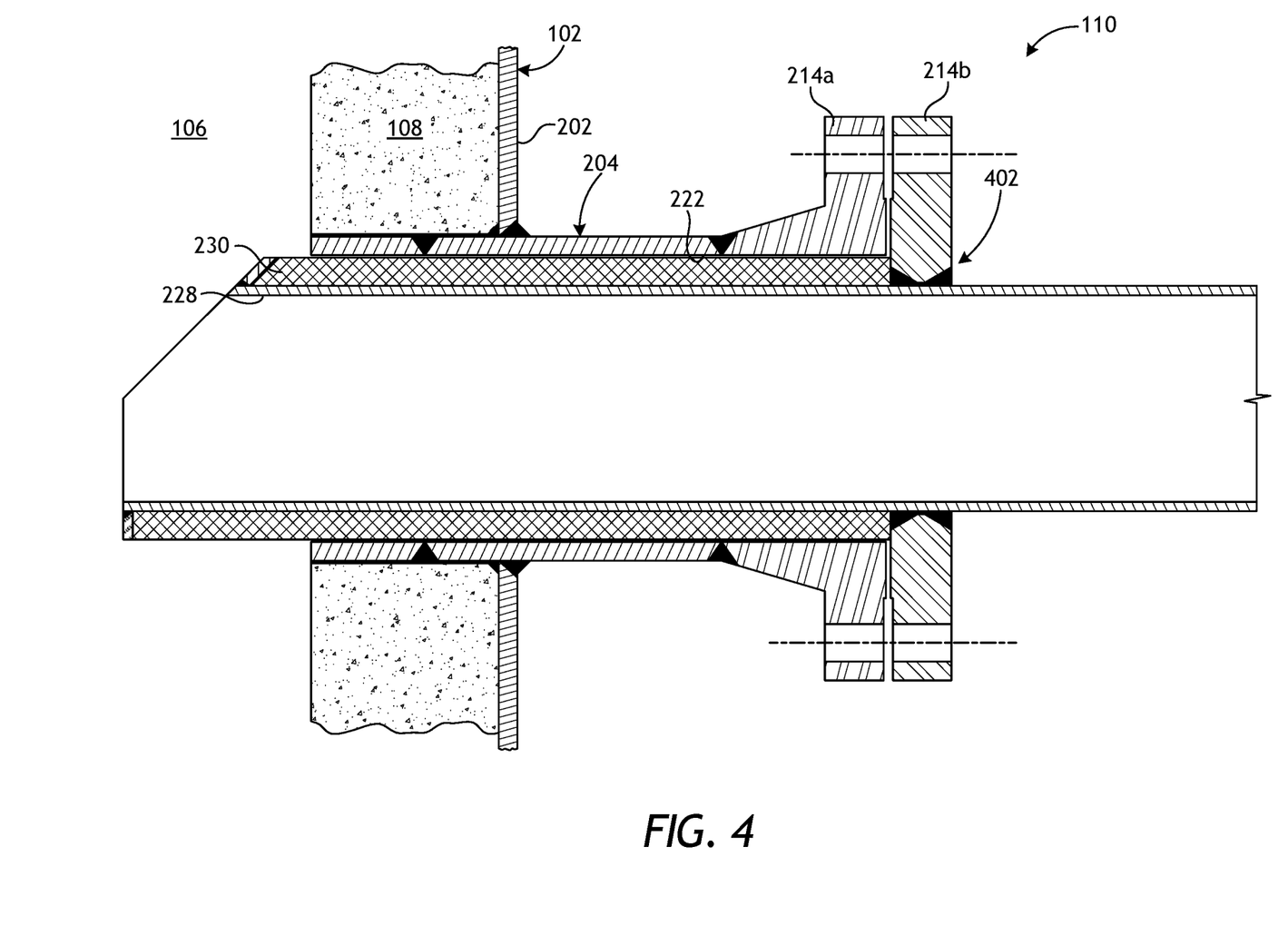
FIG. 4 is an enlarged cross-sectional side view of another example of one of the nozzle assemblies of FIG. 1, according to one or more additional embodiments of the present disclosure.

FIG. 4 is an enlarged cross-sectional side view of another example of one of the nozzle assemblies 110 of FIG. 1, according to one or more additional embodiments of the present disclosure. The nozzle assembly 110 of FIG. 4 may be similar in some respects to the nozzle assembly 110 of FIGS. 2-3 and therefore will be best understood with reference thereto, where like numerals will refer to like components not described again in detail. As with the nozzle assembly 110 depicted in FIGS. 2-3, the nozzle assembly 110 of FIG. 4 may represent any of the nozzle assemblies 110 of FIG. 1, or alternatively any nozzle assembly that may be used in conjunction with any refractory-lined equipment mentioned herein.

As illustrated, the nozzle assembly 110 may be coupled to the sidewall 202 of the vessel 102 and extend a short distance into the interior 106. The nozzle assembly 110 may include the outer sleeve 204 and a nozzle cartridge assembly 402 may be positionable within the central passageway 222 of the outer sleeve 204. The nozzle cartridge assembly 402 may be removably coupled to the outer sleeve 204 to enable a worker to disengage and retract the nozzle cartridge assembly 402 from the outer sleeve 204 external to the vessel 102. In some embodiments, for example, the nozzle cartridge assembly 402 may include the second flange 214b that may be coupled to the first flange 214a via a bolted flange connection, as generally described above. In other embodiments, however, the nozzle cartridge assembly 402 may be removably coupled to the outer sleeve 204 via other removable attachment means such as, but not limited to, a snap-fit or collet engagement, an interference fit, welded flanges 214a,b, or any combination thereof.

As illustrated, the nozzle cartridge assembly 402 may include the inner sleeve 228 and the refractory lining 230 disposed about the inner sleeve 228. In the illustrated embodiment, the inner sleeve 228 operates as an open-ended nozzle and, therefore, will be referred to herein as a "nozzle 228." The nozzle 228 may be used to introduce a variety of substances into the interior 106 such as, but not limited to, a gas (e.g., air, nitrogen, steam, etc.), a liquid (e.g., crude oil, water, etc.), a chemical, a fluid solid (e.g., a catalyst, coke particles, additives, a sulfur or amine gas for incineration, etc.), a pollution control agent (e.g., SOx emission reduction, a pH additives, etc.), or any combination thereof. In other embodiments, however, the nozzle 228 may be used to remove substances (e.g., gases, liquids, etc.) from the equipment.

As with the nozzle assembly 110 of FIGS. 2-3, the nozzle assembly 110 of FIG. 4 is able to be detached from the outer sleeve 204. A new, replacement nozzle cartridge assembly may then be installed in the outer sleeve 204 via the central passageway 222, which acts as a guide. The new nozzle cartridge assembly may then be removably attached to the outer sleeve 204 in any of the ways mentioned herein for removably attaching the nozzle cartridge assembly 402 to the outer sleeve 204.

Accordingly, the nozzle assembly 110 of FIG. 4 includes an externally retractable, refractory-lined nozzle cartridge assembly 402, which eliminates the need for a worker to physically enter the interior 106 of the vessel to inspect the nozzle assembly 110 or the nozzle 228. Instead, the process of removing, inspecting, and replacing (if needed) the nozzle cartridge assembly 402 may be all be accomplished outside of the vessel 102. Moreover, the damaged nozzle cartridge assembly 402 may be swapped out with a prefabricated replacement nozzle cartridge assembly, thus eliminating the onerous task of attaching a new nozzle, assembling the associated refractory, and curing the refractory for operational use.

Embodiments disclosed herein include:

A. A refractory-lined equipment that includes a vessel defining an interior at least partially lined with a refractory material, and a nozzle assembly coupled to the vessel and extending into the interior, the nozzle assembly including an outer sleeve fixed to the sidewall and extending through an aperture defined in the sidewall, the outer sleeve defining a central passageway, and a nozzle cartridge assembly positionable within the central passageway and including an inner sleeve, a refractory lining disposed about the inner sleeve, and a nozzle positioned within the inner sleeve, wherein the nozzle cartridge assembly is removably coupled to the outer sleeve external to the vessel.

B. A method that includes locating a nozzle assembly coupled to a vessel of refractory-lined equipment, the vessel defining an interior at least partially lined with a refractory material, and the nozzle assembly extending into the interior and including an outer sleeve fixed to the sidewall and extending through an aperture defined in the sidewall, the outer sleeve defining a central passageway, and a nozzle cartridge assembly positioned within the central passageway and including an inner sleeve, a refractory lining disposed about the inner sleeve, and a nozzle positioned within the inner sleeve, uncoupling the nozzle cartridge assembly from the outer sleeve external to the vessel, and retracting the nozzle cartridge assembly from the outer sleeve external to the vessel.

C. A nozzle assembly that includes an outer sleeve sized to extend through an aperture defined in a sidewall of a vessel of refractory-lined equipment, the outer sleeve defining a central passageway, and a nozzle cartridge assembly positionable within the central passageway and configured to be removably coupled to the outer sleeve external to the vessel, the nozzle cartridge assembly including a nozzle and a refractory lining interposing the nozzle and an inner wall of the outer sleeve.

Each of embodiments A, B, and C may have one or more of the following additional elements in any combination: Element 1: wherein the vessel forms part of equipment selected from the group consisting of a reactor, a thermal processing unit, a pressure vessel, a fired heater, a furnace, a conveyance line, a fixed bed reactor, a gasifier, an incinerator, a drum, a stack, a coker unit, and any combination thereof. Element 2: wherein the outer sleeve comprises a first portion made of a first material and a second portion made of a second material different from the first material, and wherein the first portion is exposed to the interior of the vessel. Element 3: wherein the nozzle cartridge assembly has a first end and a second end opposite the first end, and wherein the first end is extendable into the interior and the second end is removably coupled to the outer sleeve. Element 4: wherein first end extends past an end of the outer sleeve and into the interior. Element 5: wherein the nozzle cartridge assembly is removably coupled to the outer sleeve at a flanged connection. Element 6: wherein the refractory lining comprises a hexagonal mesh that defines a plurality of discrete refractory cells, and wherein refractory material is positioned within each refractory cell. Element 7: wherein the nozzle cartridge assembly further includes a refractory layer interposing the inner sleeve and the nozzle. Element 8: wherein the nozzle is an instrumentation nozzle or a feed nozzle. Element 9: wherein the nozzle comprises a nozzle sleeve and an instrumentation nozzle arranged within and removably coupled to the nozzle sleeve.

Element 10: further comprising inserting a prefabricated replacement nozzle cartridge assembly into the outer sleeve via the central passageway, and removably coupling the prefabricated replacement nozzle cartridge assembly to the outer sleeve. Element 11: wherein the nozzle is an instrumentation nozzle and the method further comprises measuring one or more operational parameters within the interior with one or more sensors positioned in the instrumentation nozzle. Element 12: wherein the nozzle is a feed nozzle and the method further comprises introducing one or more of a gas, a liquid, and a chemical into the interior via the feed nozzle.

Element 13: wherein the nozzle cartridge assembly further includes an inner sleeve, and the refractory lining is disposed about the inner sleeve. Element 14: wherein the nozzle cartridge assembly further includes a refractory layer interposing the inner sleeve and the nozzle. Element 15: wherein the nozzle cartridge assembly has a first end and a second end opposite the first end, and wherein the first end is extendable past an end of the outer sleeve and the second end is configured to be removably coupled to the outer sleeve. Element 16: wherein the refractory lining is prefabricated, cured, and fired prior to installation. Element 17: wherein the nozzle is an instrumentation nozzle or a feed nozzle.

By way of non-limiting example, exemplary combinations applicable to A, B, and C include: Element 3 with Element 4; Element 3 with Element 5; and Element 13 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

The invention claimed is:

1. A refractory-lined equipment, comprising:
   a vessel defining an interior at least partially lined with a refractory material, wherein the vessel having a sidewall; and
   a nozzle assembly coupled to the vessel and extending into the interior, the nozzle assembly including:
      an outer sleeve fixed to the sidewall and extending through an aperture defined in the sidewall, the outer sleeve defining a central passageway; and
      a nozzle cartridge assembly positionable within the central passageway and including an inner sleeve, a refractory lining disposed about the inner sleeve, and a nozzle positioned within the inner sleeve,
   wherein the nozzle cartridge assembly is removably coupled to the outer sleeve external to the vessel.

2. The refractory-lined equipment of claim 1, wherein the vessel forms part of equipment selected from the group consisting of a reactor, a thermal processing unit, a pressure vessel, a fired heater, a furnace, a conveyance line, a fixed bed reactor, a gasifier, an incinerator, a drum, a stack, a coker unit, and any combination thereof.

3. The refractory-lined equipment of claim 1, wherein the outer sleeve comprises a first portion made of a first material and a second portion made of a second material different from the first material, and wherein the first portion is exposed to the interior of the vessel.

4. The refractory-lined equipment of claim 1, wherein the nozzle cartridge assembly has a first end and a second end opposite the first end, and wherein the first end is extendable into the interior and the second end is removably coupled to the outer sleeve.

5. The refractory-lined equipment of claim 4, wherein first end extends past an end of the outer sleeve and into the interior.

6. The refractory-lined equipment of claim 4, wherein the nozzle cartridge assembly is removably coupled to the outer sleeve at a flanged connection.

7. The refractory-lined equipment of claim 1, wherein the refractory lining comprises a hexagonal mesh that defines a plurality of discrete refractory cells, and wherein refractory material is positioned within each refractory cell.

8. The refractory-lined equipment of claim 1, wherein the nozzle cartridge assembly further includes a refractory layer interposing the inner sleeve and the nozzle.

9. The refractory-lined equipment of claim 1, wherein the nozzle is an instrumentation nozzle or a feed nozzle.

10. The refractory-lined equipment of claim 1, wherein the nozzle comprises a nozzle sleeve and an instrumentation nozzle arranged within and removably coupled to the nozzle sleeve.

11. A method, comprising:
locating a nozzle assembly coupled to a vessel of refractory-lined equipment, the vessel defining an interior at least partially lined with a refractory material, and the nozzle assembly extending into the interior and including:
an outer sleeve fixed to the sidewall and extending through an aperture defined in the sidewall, the outer sleeve defining a central passageway; and
a nozzle cartridge assembly positioned within the central passageway and including an inner sleeve, a refractory lining disposed about the inner sleeve, and a nozzle positioned within the inner sleeve;
uncoupling the nozzle cartridge assembly from the outer sleeve external to the vessel; and
retracting the nozzle cartridge assembly from the outer sleeve external to the vessel.

12. The method of claim 11, further comprising:
inserting a prefabricated replacement nozzle cartridge assembly into the outer sleeve via the central passageway; and
removably coupling the prefabricated replacement nozzle cartridge assembly to the outer sleeve.

13. The method of claim 11, wherein the nozzle is an instrumentation nozzle and the method further comprises measuring one or more operational parameters within the interior with one or more sensors positioned in the instrumentation nozzle.

14. The method of claim 11, wherein the nozzle is a feed nozzle and the method further comprises introducing one or more of a gas, a liquid, and a chemical into the interior via the feed nozzle.

15. A nozzle assembly, comprising:
an outer sleeve sized to extend through an aperture defined in a sidewall of a vessel of refractory-lined equipment, the outer sleeve defining a central passageway; and
a nozzle cartridge assembly positionable within the central passageway and configured to be removably coupled to the outer sleeve external to the vessel, the nozzle cartridge assembly including a nozzle and a refractory lining interposing the nozzle and an inner wall of the outer sleeve, wherein the nozzle cartridge assembly further includes an inner sleeve, and the refractory lining is disposed about the inner sleeve.

16. The nozzle assembly of claim 15, wherein the nozzle cartridge assembly further includes a refractory layer interposing the inner sleeve and the nozzle.

17. The nozzle assembly of claim 15, wherein the nozzle cartridge assembly has a first end and a second end opposite the first end, and wherein the first end is extendable past an end of the outer sleeve and the second end is configured to be removably coupled to the outer sleeve.

18. The nozzle assembly of claim 15, wherein the refractory lining is prefabricated, cured, and fired prior to installation.

19. The refractory-lined equipment of claim 15, wherein the nozzle is an instrumentation nozzle or a feed nozzle.

* * * * *